United States Patent [19]
Ausnit

[11] 3,808,649
[45] May 7, 1974

[54] PERMANENTLY CLOSABLE FASTENER

[76] Inventor: Steven Ausnit, 124 E. 61st St., New York, N.Y. 10021

[22] Filed: July 26, 1971

[21] Appl. No.: 166,198

[52] U.S. Cl. .................................. 24/201 C, 150/3
[51] Int. Cl. ...................... A44b 17/00, A44b 19/00
[58] Field of Search............ 24/90 F, 201 C, 16 PB, 24/305; 150/3; 220/43

[56] References Cited
UNITED STATES PATENTS

| | | | |
|---|---|---|---|
| 2,144,755 | 1/1939 | Freedman | 150/36 X |
| 3,338,285 | 8/1967 | Jaster | 150/3 |
| 3,364,530 | 1/1968 | Kraus | 24/201 C |
| 3,633,787 | 1/1972 | Katz | 220/43 R |
| 2,189,138 | 2/1940 | Eichner | 24/201 C |
| 3,347,298 | 10/1967 | Ausnit et al. | 24/201 C |
| 3,353,662 | 11/1967 | Pickin | 24/30.5 R |
| 3,410,327 | 11/1968 | Ausnit | 24/201 C X |
| 3,572,191 | 3/1971 | Bannies | 24/201 C |
| 3,600,027 | 8/1971 | Noland | 24/16 PB |

Primary Examiner—Paul R. Gilliam
Attorney, Agent, or Firm—Hill, Sherman, Meroni, Gross & Simpson

[57] ABSTRACT

A flexible fastener for joining plastic sheets such as in closing the tops of bags wherein the fastener strips remain permanently closed once they are joined. The strips include a first strip formed of a plastic material having a web portion with a rib element extending continuously therealong having a neck portion and an enlarged head with a second fastener strip formed of a plastic material with a web portion having a groove element extending therealong formed of a pair of spaced jaws with a head retaining groove therein shaped to correspond to the shape of the head and with an entrance slot leading to the groove with the head and jaws being such that they will not interlock when pressed together but can be interlocked only by an external joining tool which forcibly spreads the jaws apart, places the rib element in position and allows the jaws to close around said rib so that once interlocked, they cannot be separated by pulling apart on the webs.

9 Claims, 20 Drawing Figures

INVENTOR.
STEVEN AUSNIT

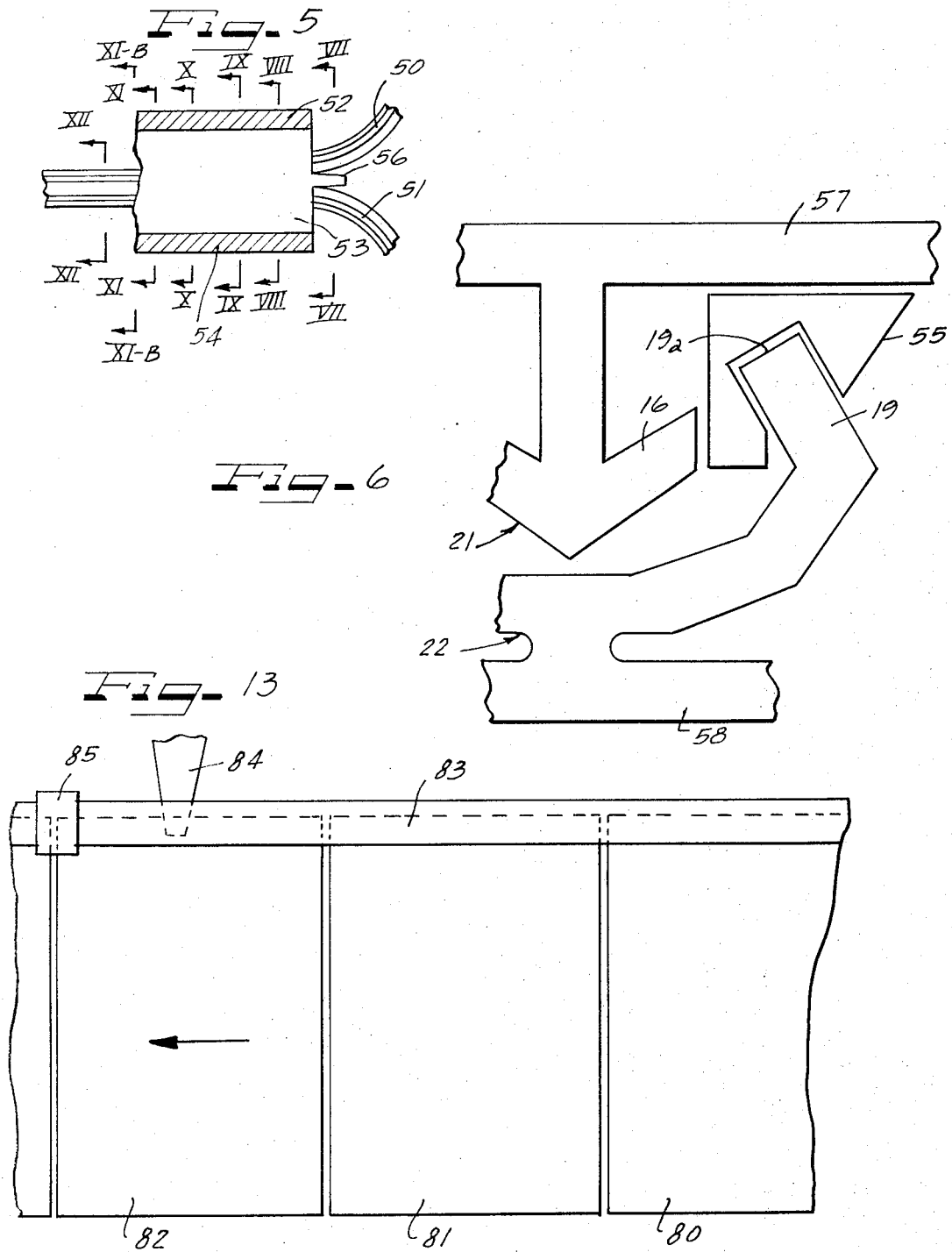

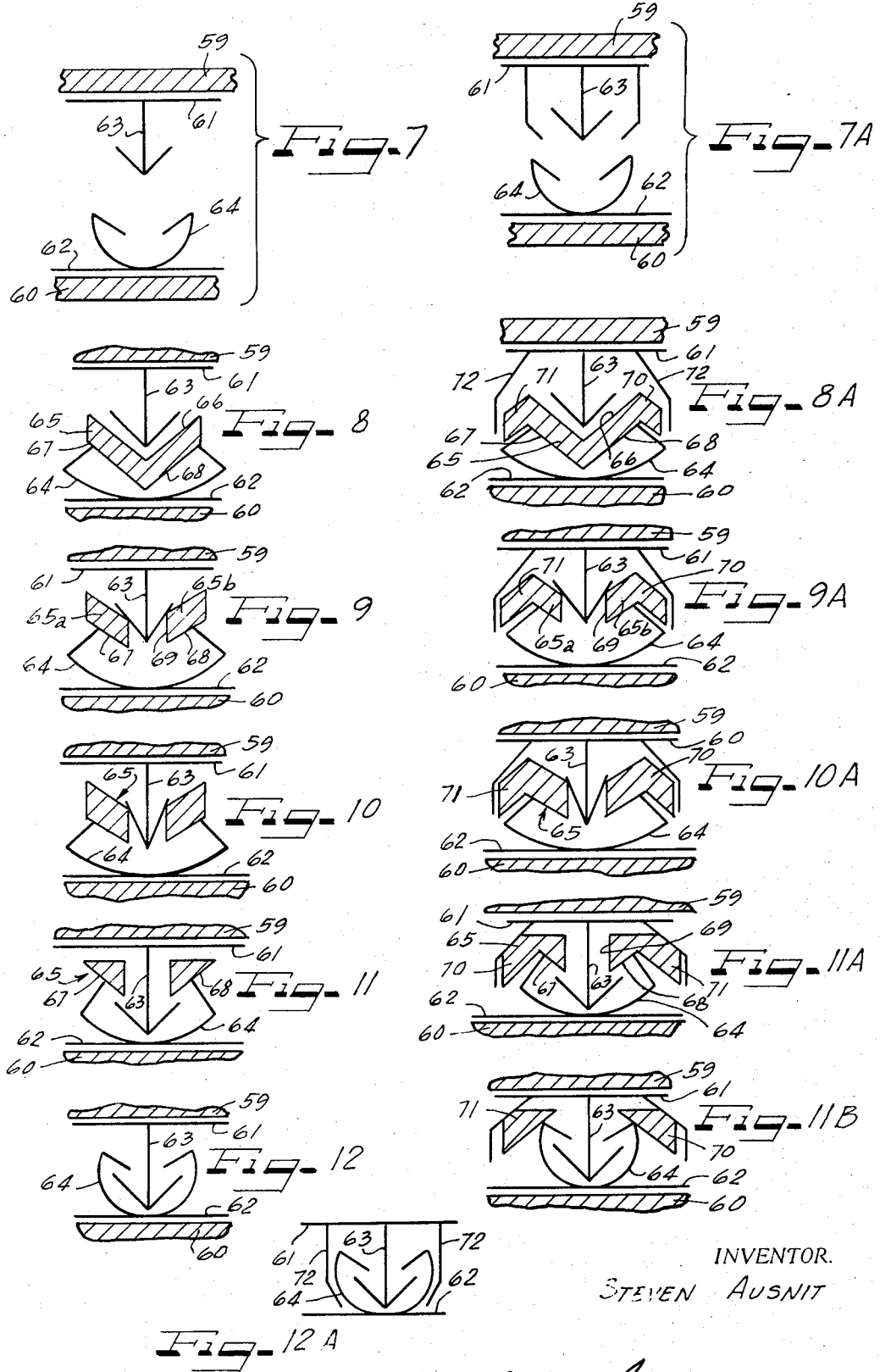

3,808,649

PERMANENTLY CLOSABLE FASTENER

BACKGROUND OF THE INVENTION

The invention relates to a novel structure for closing bags and attaching sheets together wherein shaped fastener members are provided that cannot be joined to each other except by a joining tool which distorts them so that they interlock, and once interlocked, they cannot be forcibly pulled apart, but can be separated only by tearing apart or by a separating tool.

In the packaging of products in bags, various concepts have been used for closing the bags before shipping and marketing. These concepts can be generally divided into two types of structures, one where the bag is permanently closed such as by heat sealing, and cannot be opened except by tearing or cutting or otherwise destroying the bag itself. The other concept is a reclosable arrangement wherein the edge of the bag carries some interlocking fastener which can be pressed or snapped together and can be forcibly separated when the bag is to be opened and the contents to be removed.

The present invention provides a new concept enjoying certain advantages of both types wherein a permanently closable type of fastener is employed at the top of the bag, but the fastener does not require the type of closing operation which has a permanent effect on the top so that it cannot be reopened without tearing or cutting or a similar form of destruction. Yet, the fastener is of a permanent type that cannot be accidentally opened due to distortions or forces on the fastener or bag walls during handling and shipping.

In accordance with the concept of the present invention, a pair of continuous mechanically interlocking plastic fastener strips are provided at the top edges of the bag which can be interlocked only with the application of an interlocking tool that is applied after the bag is filled in order to close it. The bag is held permanently closed by the fastener strips and the top edges of the bag cannot be pulled apart or separated. To again open the bag requires the use of a special tool, or, of course, the bag can be opened by cutting or tearing.

In permanently closable bags of the type heretofore available, there were inherent characteristics which were disadvantageous for many types of products. Where a bag had to be cemented closed, it required the presence of liquid cement, required time to harden and to apply and retarded the speed of the form filling of the bag. Where the bag had to be heat sealed, the presence of heat was disadvantageous and required time for the bag to cool. Additionally, heat sealing equipment can be complex and requires continuous maintenance. Where the bag had to be sewed, it required the presence of sewing machinery. Similarly, where a bag had to be stapled shut, stapling equipment had to be present and the completed closure was not air or moisture tight. Also, most of these types of bags frequently embodied the disadvantages of expense in intial cost of equipment or in the time required to be formed, filled and closed, and some types are not impervious to air and moisture. Generally speaking, the speed of the closing operation governed the speed of the filling operation.

An object of the present invention is to provide a novel and unique manner of closing bags or joining the edges of sheets or film which avoids the disadvantages and encumbrances of the closing structures heretofore available. While the principles of the present invention may be employed in joining sheets of any form, for convenience of description, reference will be made primarily to utilization for closing bags or pouches.

A further object of the invention is to provide an improved type of flexible fastener which can be used to form a permanent closure of bags utilizing plastic strips which mechanically attach to each other in such a manner so as not to require additional closing elements such as adhesive or metal or cloth binders which would be objectionable for bags of certain contents.

A still further object of the invention is to provide an improved rapidly closable permanent fastener which is capable of use in the high speed joining of the edges of two sheets of material such as joining the top edges of bags.

A still further object of the invention is to provide a unique new form of plastic fastener member which is capable of forming a permanent air and moisture proof junction between sheets of film.

The principles of the invention will be taught in connection with the description of the preferred embodiments and it will be appreciated by those versed in the art that other modifications and arrangements may be employed within the spirit and scope of the invention, and other advantages and objects will become apparent from the claims, description, and drawings, in which:

IN THE DRAWINGS

FIG. 5 is a somewhat schematic showing of a joining tool being passed along the strips, viewing the tool from the top as the strips are being joined;

FIG. 6 is a somewhat schematic top plan view of a separating tool being used for separating the strips;

FIGS. 7 through 12 are schematic sectional views taken substantially along the consecutive corresponding section lines labeled VII—VII through XII—XII of FIG. 5;

FIGS. 7A through 12A are schematic sectional views taken substantially along the same consecutive section lines marked VII—VII through XII—XII of FIG. 5 showing the joining of another form of profile structure; and FIG. 13 is a plan view illustrating a number of bags being closed having a construction in accordance with the present invention.

DESCRIPTION OF THE PREFERRED EMBODIMENTS

Figure 1:
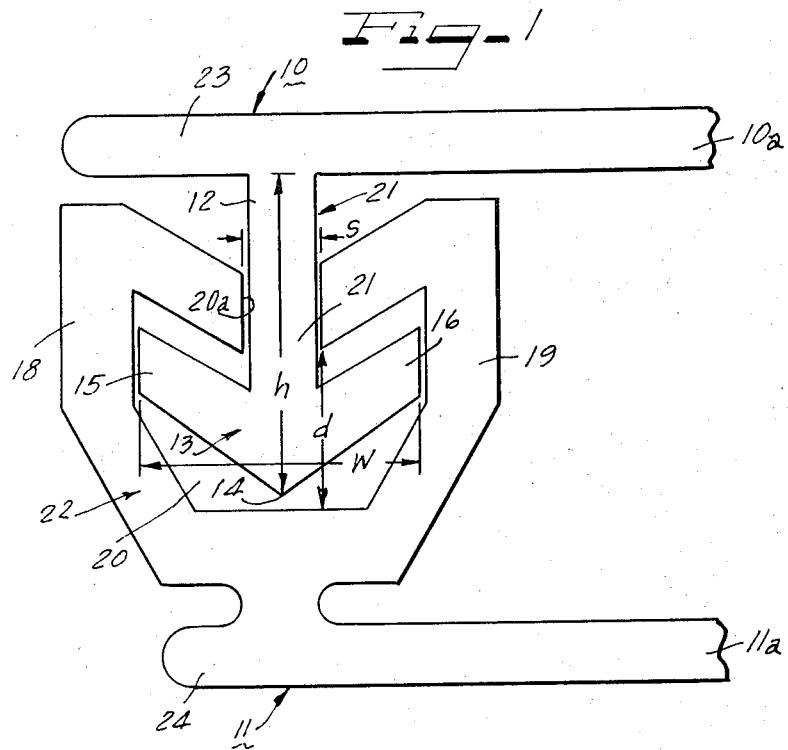
FIG. 1 is an enlarged sectional view showing the profiles of fastener strips constructed in accordance with the principles of the present invention.

FIG. 1 illustrates a cross-sectional view of the profiles of continuous closing strips formed of plastic material. The first fastener strip 10 and a second fastener strip 11 are arranged to be joined to each other to form a permanent junction or closure between the sheets. The strips include a web 23 of the first fastener strip and a web 24 of the second fastener strip. The webs are connected to or integral with plastic film sheets 10a and 11a respectively which may be the front and rear wall of bags. Where a bag is employed, the front and rear wall are joined along their edges when first constructed, and are filled through the opening at the top between the strips 10 and 11 and when the bags are filled, the strips are joined.

For permanent joining, the strips carry shaped mating interlocking profiles. On the first strip 10 is a rib element 21 and on the second strip 11 is a groove element 22. The strips are continuous and are formed of a plastic material that may be relatively hard for the purposes of forming a strong permanent closure for the bag. In one arrangement the rib element 21 and groove element 22 are of a relatively hard plastic whereas the webs 23 and 24 are of a softer material. The strips may be formed by an extrusion process and attached to the film sheets 11a and 10a by heat sealing, or the strip 10 and its rib element may be formed integrally with its film 10a and the strip 11, and its groove element formed integrally with its film 11a in a single extrusion process with, if so desired, separate plastic materials being fed to the die opening so that the film is of a relatively shoft pliable clear plastic material and the strips are of a relatively hard plastic material.

The strip 10 includes a web 23 with a rib element 21 attached thereto. The rib element has a neck portion 12 with a head 13 thereon. The head is preferably arrowhead shaped with a tip 14 and side barbs 15 and 16.

The second strip 11 has a web 24 with a groove element 22 thereon having jaws 18 and 19 which are shaped to form a groove 20 therebetween. The groove is broadly complementary shaped to the head 13 and between the jaws 18 and 19 is an entrance slot 20a.

For purposes of reference, the height of the head will be referred to as $h$, which is its dimension measured in the direction of the groove from its base, at the point it is joined to its strip, to its top, and the width will be referred to as $w$, which is the width measurement to the outer extremities of the barbs 15 and 16. The width of the entrance slot is $s$.

In a preferred arrangement the width of the head $w$ is equivalent to the width of the groove and is at least twice the width $s$ of the entrance slot 21.

The depth of the groove 20 will be referred to as $d$, which is the distance from the ends of the jaws 18 and 19 to the base of the groove 20, as illustrated in FIG. 1.

Figure 4:
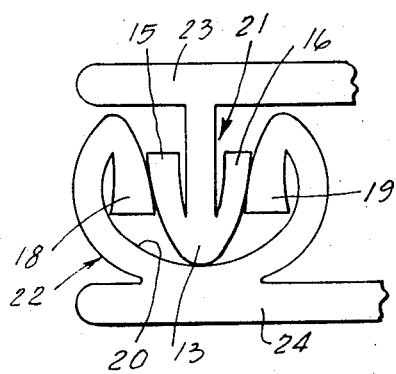
FIG. 4 is a sectional view illustrating the relative positions of parts of the profile as they are pressed together (but not interlocked) without the presence of a joining tool.

A feature of the invention is that the rib element 21 is constructed relative to the groove element 22, as shown in FIG. 4, so that the head 13 cannot lock in the groove when pressed therein. The ends of the jaws 18 and 29 will not clear the barbs 15 and 16, and the head will not interlock in the groove 20. In other words, when the head is pressed into the groove, the distance from the tip of the head to the ends of the side barbs is greater than the distance from the base of the groove to the ends of the jaws. When the rib and groove elements are to be permanently interlocked, the barbs are forcibly pressed inwardly, and the jaws are forcibly wrapped over the barbs.

By the same token, once the head 13 is interlocked into the groove 20, it cannot be removed by pulling apart on the webs 23 and 24. Interlocking of the rib element 21 into the groove element 21 can be accomplished only by the use of external forces applied by an attaching tool which separates the jaws 18 and 19 illustrated in the manner shown in FIGS. 7 through 12. In other words, once the groove and rib elements are interlocked, they cannot be pulled apart forcibly by pulling laterally outwardly on the strips or on the webs extending from the strips. When an attempt is made to forcibly pull apart the strips, they will not separate. The maximum width that the jaws will spread when an attempt is made to forcibly pull apart the strips is such that the entrance slot between the jaws has a maximum width less than the width of the head measured to the ends of the barbs.

Figure 2:
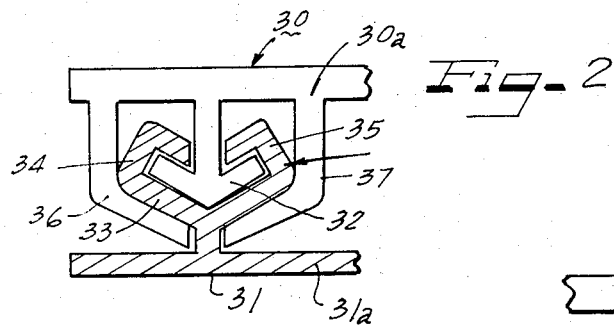
FIG. 2 is a sectional view showing another form of strip profile.

FIG. 2 shows a modification of the permanent form of fastener of the present invention wherein first and second fastener strips 30 and 31 are shown. These fastener strips attach to or are integral with film sheets. The strip 30 has a web portion 30a to which is attached a rib element 32. The second strip 31 has a web portion 31a to which is attached a groove element 33. The groove element includes jaws 34 and 35 which form a groove therein for interlockingly receiving the head 32. To aid in the permanency of joining, outer holding arms 36 and 37 are provided to help clamp the jaws 34 and 35 over the head once the head has been interlocked in place. The principles of this structure are similar to that of FIG. 1, but the closing tool must provide some additional functions as will be illustrated in connection with FIGS. 7A through 12A.

Figure 3:
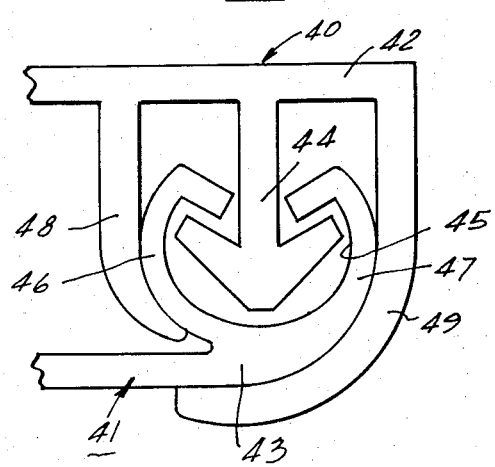
FIG. 3 is a sectional view showing still another form of strip profile.

FIG. 3 illustrates still another form with a first fastener strip 40 and a second fastener strip 41. The first fastener strip has a web 42 with a rib element 44 thereon. The second fastener strip 41 has a web 43 with a groove element 45 thereon including jaws 46 and 47 which grip the head of the rib element 44. Outwardly of the jaws 46 and 47 are arms 48 and 49 which aid in holding the jaws in place over the head of the rib element 44. The outer arm 49 extends beyond the jaw 47 and around beneath the strip 41 so as to provide additional support for the permanency of the juncture between the two strips 40 and 41.

FIG. 5 illustrates a pair of strips having the construction of either of FIGS. 1, 2 or 3 as they are joined by an attaching tool 53 carried on an arm 56 which is positioned so that the strips can be drawn along and through the tool. The tool has elements for directly engaging the plastic of the strips and deforming the plastic so that the strips will interlock. As the strips 50 and 51 are passed along the tool 53, its outer walls 52 and 54 and other elements, not shown in detail in FIG. 5, operate on the strips.

In FIG. 6 the closed strips 57 and 58 are shown being separated by the separating tool 55 similar to the tool 53 of FIG. 5 moved in an opposite direction. The function the separating tool 55 of FIG. 6 is merely the inverse of the tool 53 of FIG. 5 so that the function of both tools can be considered at the same time in connection with FIGS. 7 through 12 and 7A through 12A. In these figures the rib and groove elements are shown schematically for ease of illustration.

The concept of the closure of the permanently joinable strips of the instant invention may be contrasted with reclosable plastic fastener strips of the type heretofore available. With these previous types, the construction of the fastener strips was such that it was possible to merely press said strips together so that when such pressure was applied to their outer surfaces, the fastener profiles would automatically join. That is, the fastener parts would engage directly and would deform as required during their own engagement. In the present arrangement, the fastener strip construction will not allow sufficient deformation so that self-engagement between the parts is not possible and they will not interlock. It is required that an external tool directly engage the strips to deform them or change their relative positions and shapes for the interlocking operation. In a preferred arrangement, the joining tool or the separating tool functions on the strips by applying a spreading pressure to the jaws and guiding the jaws so that they wrap or unwrap around the head portion of the groove element.

In FIGS. 7 through 12 the closing operation of strips such as shown in FIG. 1 is illustrated. The first strip 61 has a rib element 63 thereon and a second strip 62 has a groove element with jaws 64 thereon. The closing tool is provided at a closing station with the strips fed into the tool and the outer surfaces of the strips engaged by walls 59 and 60 of the tool.

As the strips are moved along the tool, the tool progressively deforms portions of the strip as will be seen from the drawings.

As shown in FIG. 8, the tool includes a center cam portion 65 which has outer cam surfaces 67 and 68 that slope outwardly and press apart the jaws 64. As the strips move relative to the closing tool, the cam 65 develops a gap 69 as shown in FIG. 9, while the cam surfaces 67 and 68 continue to spread the jaws 64. The gap 69 in the cam 65 admits the head of the rib element 63 which then enters the slot between the jaws 64 as the outer walls 59 and 60 of the closing tool cone together and press the strips together.

As shown in FIG. 10, continued movement of the strips through the closing tool forces the head of the rib element 63 through the gap 69 further into the groove.

Further along the closing tool, as shown in FIG. 11, the head of the rib element 63 is forced to the base of the groove between the spread jaws 64 so that the jaws clear the barbs or sides of the rib element 63.

Further along the closing tool, as shown in FIG. 12, the cam 65 terminates to let the jaws 64 snap together over and around the head of the rib element 63. The strip 61 and 62 are then permanently locked together, at least up to the physical limits of the plastic from which they are made.

As may be seen in connection with FIG. 8A, where a fastener having a construction such as shown in FIG. 2 is employed, the center cam 65 is provided with outer cam wings 70 and 71 for spreading the additional rib element arms 72.

As may be seen in the sequence of drawings from 8A through 12A, the cam wings 70 and 71 spread the arms 72 outwardly so that they do not interfere with the spreading of the jaws 64, and after the jaws are released, as shown in FIG. 11B and 12A, the arms 72 are then released to bring them to the closed position over and around the jaws illustrated in FIG. 12A.

FIG. 6 illustrates in slightly more detail the construction of the cam 55 which may be provided with a recess 19a for receiving the jaw 19 and positively controlling its position as it is carried around the end of the barb 16 for locking or carried out from under the barb for unlocking.

As will be observed from each of the structures of FIGS. 1 through 3, there are no flanges extending up beyond the strips, as are usually found on conventional finger operated fastener strips. This is because the strips when closed, cannot be drawn apart and extensions of the webs would have no function. In order to open a bag which has closure strips in accordance with the present structure, an opening tool such as shown in FIGS. 5 and 6 is required, or in some instances, the entire top of the bag may be torn or cut off. Should flanges above the fastener strips be used, they would serve an entirely different function such as guiding the fastener strips through a form fill machine. In all probability the flanges would then be cut off, unless they had another use such as having a hole punched in them, so that they could be used for rack hanging and the filled and closed bag formed below them.

When the strips are permanently locked, they cannot again be reopened except with the use of an opening tool which applies a plastic deforming force to the groove and/or rib elements. By contrast, in a conventional plastic zipper fastener, the application of a separating force by pulling apart on the strips will cause the rib and groove elements to self-deform and separate. That is, their forces against each other will cause the rib element to separate from the groove element. In the present structure such a separating force will not separate the elements. In a preferred arrangement if an excessive force is applied such as by applying a strong opposing force to the plastic film sheets which carry the fastener strips separation can be obtained only by tearing of the plastic. That is, either the film itself will tear or the plastic parts of the rib and groove elements will tear or permanently deform. Thus, the closure is permanent in the sense that it is not constructed to be reopened except by the use of an opening tool which applies an extrinsic deforming force to the elements. The elements are so spaced and sized so that when they themselves are pulled apart, they will not normally separate. This was also contrasted with prior types of devices wherein the sliders were carried on the fastener strips. These types of sliders basically applied a separating force by directly pushing apart the rib and groove elements. A conventional slider applied to the previously described rib and groove element construction would not be able to either interlock or unlock same. In addition each slider usually remained with its fastener strip and hence had to have an uncomplicated construction and be inexpensive to manufacture. In the instant invention, the closing device, in order to perform its proper function, cannot be of simple construction and hence inexpensive and will not be provided with each bag. The device will be stationary and probably be used with form and fill mechinery, with the specially designed overwise nonopenable fastener passing through it for locking and unlocking. In the present structure a separating tool actually moves parts of the rib and groove elements to a new position by applying a force by the tool directly to the parts to move the position of said parts. It is, of course, contemplated that in some uses of the permanent fastener described herein, said fastener will be interlocked with a closing tool and will not again be unlocked and the bag will be opened by cutting or tearing.

In utilizing the closure structure in a bag filling operation, a continuous strip 83 will be attached to the top of a series of joined bags 80, 81 and 82, or be a part of the wall of such bags. The separated strips will move from right to left, as shown in FIG. 13, and a filling spout 84 will project down into the bags to fill them. Immediately following the filling spout will be a joining tool 85 (such as tool 53 of FIG. 5) which will interlock the strips mechanically and thus permanently close the bags. A severing knife, not shown, will cross cut the continuous strips 83 to form separate permanently closed bags.

Thus, it will be seen that I have provided an interlocking fastener which meets the objects and advantages above set forth, the fastener is unseparable without being passed through a special device, referred to herein as a closing tool, and the closing tool does not remain a part of the fastener. Similarly, the bags are opened only with a separate opening tool which is utilized on the site where the bags are opened, or they are opened by tearing or cutting off the bag top.

Other types of tools may be employed which directly deform the fastener material so as to permit interlocking of the rib and groove elements. The rigidity of the interlocking strips is such that the closure can be bent in a "U" or "S" form of bending without separating, and this type of bend will separate the reclosable interlocking type of fastener heretofore available. In addition, the elasticity of the web provides stretch or compression where such "U" or "S" bending does occur and helps prevent separation of the permanently joined fastener.

I claim as my invention:

1. A flexible fastener comprising in combination,
a first fastener strip formed of a plastic material and having a web portion with a rib element extending continuous therealong, said rib element having a neck portion attached to the web and with an enlarged head thereon with a tip at the distal end of the head and side barbs projecting from the sides of the head,
a second fastener strip formed of a plastic material with a web portion having a groove element extending continuously therealong having a pair of jaws spaced to form a head retaining groove therebetween and with an entrance slot leading to the base of the groove and the groove shaped to correspond approximately to the shape of the head.
the dimensions of the elements being such when the head is pressed into the groove and the barbs lie along the head that the length of the head from the tip to the ends of the barbs is longer than the distance from said base of the groove to the ends of said jaws whereby said jaws will not pass around the head to lock around the barbs when he head is merely pressed into the slot and whereby the strips must be interlocked by forcibly wrapping the jaws over the barbs.

2. A flexible fastener constructed in accordance with claim 1 and including a first film of plastic attached to the web of the first fastener and a second film of plastic attached to the web of the second fastener strip.

3. A flexible fastener constructed in accordance with claim 1 and including first and second films of plastic respectively integral with the web portions of said first and second strips.

4. A flexible fastener constructed in accordancd with claim 1 wherein the width of the head is at least twice the width of said entrance slot.

5. A flexible fastener comprising in combination,
a first fastener strip formed of a plastic material having a web portion with a rib element extending continuously therealong, said rib element having a neck portion attached to the web with an enlarged head thereon having a tip and barbs extending laterally from the head, and
a second fastener strip formed of a plastic material with a web portion having a groove element extending continually therealong formed of a pair of jaws spaced to form a groove therebetween shaped to correspond approximately to the shape of the head with an entrance slot leading to the base of the groove and the jaws wrapped around the barbs in interlocked relationship,
said jaws being separable from each other a limited distance as said strips are forcibly pulled apart to provide a maximum width entrance slot between the jaws,
said maximum slot width being less than the width of the head measured to the ends of the barbs.

6. A structure including a flexible fastener in accordance with claim 5 and including a bag having a plastic front wall and a plastic rear wall with said walls joined to each other on three sides wih the fourth side joined by the strips with the web of one strip attached to the front wall and the web of the other strip attached to the rear wall.

7. A flexible fastener in accordance with claim 5 wherein said webs have plastic films extending downwardly with an absence of web or film extending upwardly from the strips.

8. A flexible fastener in accordance with claim 5 wherein the jaws are further retained in locking position by additional arms on either side.

9. A structure in accordance with claim 6 wherein the fastener strips are bonded by a bond of plastic to the bag walls.

* * * * *